INVENTOR.
RAYMOND A. RUNYAN
BY
Kenyon & Kenyon
ATTORNEYS

INVENTOR.
Raymond A. Runyan
BY
Kenyon & Kenyon
ATTORNEYS 3,245,006
PHASE DETECTOR-MODULATOR Raymond A. Runyan, Ridgefield, Conn., assignor to Data-Control Systems, Inc., Danbury, Conn., a corporation of Delaware Continuation of application Ser. No. 52,665, Aug. 29, 1960. This application June 27, 1963, Ser. No. 291,057
7 Claims. (Cl. 332—43)

Figure 1:
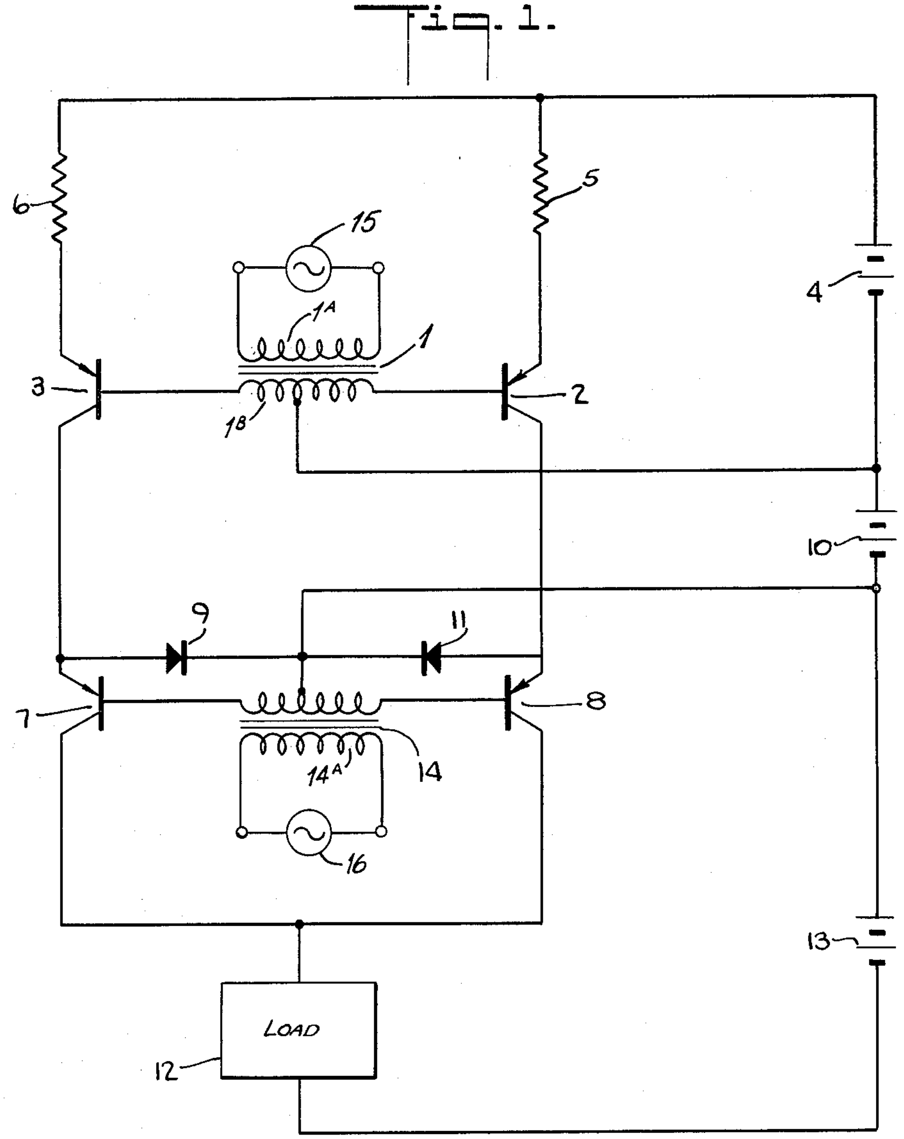

This application is a continuation of application Serial No. 52,665, filed August 29, 1960, now abandoned.

This invention relates to a circuit arrangement which is suitable for use either as a phase detector or as a modulator.

In communications systems, there is presently known a circuit arrangement called a phase-locked loop discriminator which is used for demodulating frequency modulated signals. (See Proceedings of the IRE, August, 1953, pages 1043 through 1048; Margolis, S. C., "Response of a Phase-Locked Loop to a Sinusoid Plus Noise," IRE Transactions on Information Theory, June, 1957, pp. 136–143; and Gruen, W. J., "Theory of AFC Synchronization," IRE, Pros., August 1953). Such a discriminator generally comprises a phase detector, a filter, an amplifier and a local frequency-modulated oscillator. The output from the local oscillator is fed into the phase detector along with the frequency modulated input signal which is to be demodulated. The phase detector is designed so that it produces a signal which, when fed in sequence through the filter and amplifier to the local oscillator, causes the local oscillator to change its frequency so that it tracks frequency modulated signals. The signal fed from the phase detector to the local oscillator represents the deviations in the phase of the incoming signal from the center frequency of the local oscillator. In other words, the signal which causes the local oscillator to track the frequency of the incoming signal is indicative of the change of the frequency of the incoming signal and, accordingly, represents the modulation component of the incoming signal.

It is an object of this invention to provide a circuit arrangement which may be suitably employed as a phase detector in a phase-locked loop discriminator.

It is a further object of this invention to provide a circuit arrangement which may be suitably employed as a phase detector in a phase-locked loop discriminator and thereby eliminates the use of an amplifier within the loop.

It is a further object of this invention to provide a circuit arrangement which may be used as a modulator to provide amplitude modulation of carrier frequency while maintaining minimal intermodulation effects.

Briefly stated, the circuit of this invention comprises, in combination, a first pair of alternately conducting current switching means responsive to signals from a first electrical source, for example, a frequency modulated carrier, and a second pair of alternately conducting current switching means responsive to signals from a second electrical source, for example, a reference signal. Each of the said second pair of switching means is serially connected with one of said first pair of switching means thereby forming two paths, each of which includes one of the said first and one of the said second switching means. The circuit is completed by a load connected to receive the respective currents which flow through the two paths, such currents flowing only when two serially connected switching means are conducting simultaneously.

An inherent advantage of the circuits of this invention is the high linearity of response which results generally from the fact that current switching means are employed. Since stray inductance is relatively simple to eliminate, little difficulty is experienced in obtaining an essentially non-inductive circuit, and, accordingly, there is little or no time lag involved in the switching operation.

The invention will be more readily understood when read in conjunction with the drawings in which:

FIG. 1 is a schematic diagram of a preferred form of the phase detector-modulator circuit of this invention, and FIGS. 2A through 2I represent wave forms of current and voltage at various points of the circuit in FIG. 1 when employed as a phase detector.

Referring now to FIG. 1, the circuit of this invention is depicted in a preferred form suitable for use either as a phase detector or as a modulator. The circuit will be first described in terms of its use as a phase detector in a phase-locked loop. When it is so employed, the circuit is responsive to deviations from a phase differential of 90° between the incoming frequency modulated signal and the signal from the local oscillator.

Referring again to FIG. 1, a frequency modulated signal is impressed across the primary winding 1A of transformer 1. The secondary winding 1B of transformer 1 is connected at one end to the base element of PNP transistor 2 and at the other end to the base element of PNP transistor 3. A center-tap connection to the secondary winding 1B of transformer 1 is connected to the negative terminal of D.C. potential source 4. The emitter elements of transistors 2 and 3 are connected to the positive terminal of D.C. source 4 through resistive elements 5 and 6, respectively.

The portion of the circuit described above will be analyzed at this point. By virtue of the transformer coupling means, the signals received by the base elements of transistors 2 and 3 will be in phase opposition. That is to say, when the end of the secondary winding 1B of transformer 1 which is connected to the base element of transistor 2 is at a positive potential, the other end of winding 1B will be at a negative potential. The magnitude of D.C. potential source 4 is chosen so that it is equal to, or preferably less than, one-half of the amplitude of the modulated signal which is developed across the secondary 1B of transformer 1.

Assume a point in time when the signal applied to the base element of transistor 2 is positive. The corresponding signal applied to the base element of transistor 3 will be negative. In such instance, the base element of transistor 3 will be at a relatively high negative potential with respect to the emitter element, such potential being equal approximately to source 4 plus half the signal voltage. Thus, transistor 3 will pass current, being in an "on" condition. On the other hand, the polarity of the signal voltage applied to the base element of transistor 2, will be opposed to biasing source 4 and, therefore, transistor 2 will be in an "off" condition and will not pass current. As the signal impressed across transformer 1 changes in polarity, making the base element of transistor 3 positive and the base element of transistor 2 negative, transistor 3 will be placed in an "off" condition whereas transistor 2 will commence conducting current. Thus, only one of the pair of transistors 2 and 3 will be conducting at any one time.

Referring again to FIG. 1, the collector of transistor 3 is connected to the emitter of transistor 7 and the collector of transistor 2 is connected to the emitter of transistor 8. Transformer 14 is employed to couple a reference signal impressed across primary winding 14A, to the respective base elements of transistors 7 and 8 through secondary winding 14B. In this illustration, such reference signal would be the output of the local oscillator in the phase-locked loop. Unidirectional conducting elements 9 and 11, for example, semiconductor diodes, are connected between the emitter elements of transistors 7 and 8, respectively, and the center-tap of the secondary winding 14B of transformer 14. The common junction of elements 9 and 11 at the center-tap is connected to the negative terminal of D.C. potential source 10. The positive terminal of D.C. source 10 is connected to the negative terminal of D.C. source 4. The respective collectors of transistors 7 and 8 are connected to load 12 which, in turn, is connected through D.C. source 13 to D.C. source 10, as shown.

Transistor 7 will conduct current only if two conditions are met. First, transistor 3 must be conducting current, since otherwise there is no path to enable the collector current of transistor 7 to return to the emitter. The second condition relates to the presence of the necessary bias between the emitter and base of transistor 7. When transistor 3 is conducting and transistor 7 is not conducting, the current from transistor 3 passes through element 9, D.C. sources 10 and 4 and resistor 6. The voltage drop across resistor 6 is essentially equal to the sum of the potentials of D.C. source 4 and the voltage across one-half of secondary 1B of transformer 1. At a time when the voltage across secondary 14B is of such polarity that the base is more negative than the center-tap, transistor 7 will commence to conduct current. Transistor 7 will then appear as a relatively low impedance to the current flowing from transistor 3. The polarity of the signal across secondary 14B will also have the effect of blocking element 9. Accordingly, the current from transistor 3 will flow through transistor 7 and thence through load 12. The current returns to the emitter of transistor 7 through D.C. sources 13, 10 and 4.

The same analysis is applicable to the operation of transistors 2 and 8. Accordingly, current will flow through load 12 only if one of the two pairs of serially connected transistors, i.e. pair 3 and 7 or pair 2 and 8, are simultaneously conducting. In accordance with the design of phase-locked loop discriminators, the output signal from load 12 is fed back to the local oscillator.

The value of D.C. source 10 is dependent on the secondary voltage across winding 1B. The voltage 10 must exceed the peak voltage appearing across one-half of winding 1B.

The value of D.C. source 13 is chosen on the basis of the load impedance and must be larger than the peak voltage produced in the load.

As stated above, the circuit shown in FIG. 1 is suitable for use in detecting deviations from a phase differential of 90° between an incoming signal and a reference signal. For ease of description, the operation of the circuit will first be discussed in terms of a situation in which the incoming signal impressed across the primary 1A of transformer 1 is 90° out of phase with the reference signal and is not modulated. In such instance, there would be no need for the local oscillator to change frequency since it is already synchronized with the incoming signal.

Figure 2A:
Figure 2B:
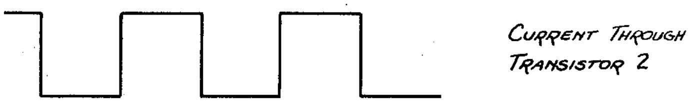
Figure 2C:
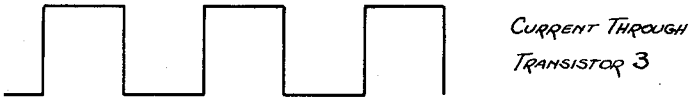
Figure 2D:
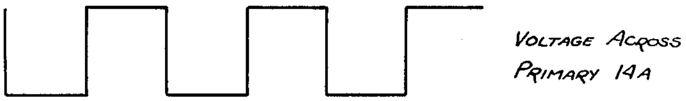
Figure 2E:
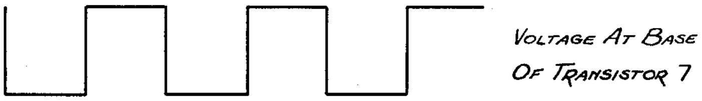
Figure 2F:
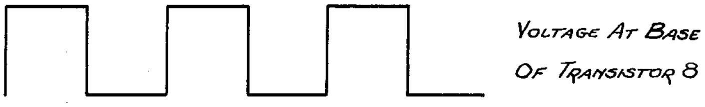

Assume that a square wave voltage as shown in FIG. 2A is impressed across primary 1A of transformer 1. The currents through transistors 2 and 3 would then be as shown in FIGS. 2B and 2C respectively. Assume also that the reference signal impressed across primary winding 14A is as shown in FIG. 2D, i.e. 90° out of phase with the signal appearing across primary 1A. The voltages at the bases of transistors 7 and 8 would then be as shown in FIGS. 2E and 2F, respectively.

Figure 2G:
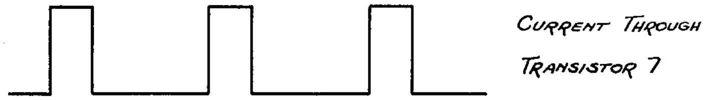

Current will flow through transistor 7 only when (1) current is flowing through transistor 3 and (2) the voltage on the base of transistor 7 is negative with respect to the emitter. FIG. 2G depicts the current flow through transistor 7, based on the above considerations.

Figure 2H:
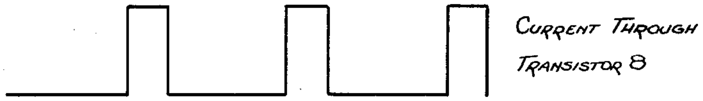

Based on the same analysis, the current flow through transistor 8 is shown in FIG. 2H.

Figure 2I:
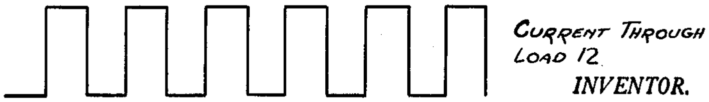

Accordingly, the current through load 12 is the sum of that flowing through transistors 7 and 8, and is shown in FIG. 2I. As shown, the current through load 12 is symmetrical and has a frequency equal to twice that of the reference signal.

If the carrier impressed across primary 1A is modulated, transistors 2 and 3 will alternately conduct, not in equal time cycles, but rather in unequal time cycles which correspond to the variations in frequency of the modulated carrier. This in turn will cause the signal output across load 12 to become asymmetrical. The output from load 12 will then reflect a D.C. unbalance whose polarity depends upon the sense of the phase differential between the incoming signal and the reference signal. This D.C. unbalance is in fact the modulation component of the incoming signal since it represents the integral with respect to time of the frequency of the incoming signal.

The circuit arrangement in FIG. 1 is also suitable for use as an amplitude modulator. One application of interest in this area is the use of this circuit to heterodyne a group of frequency multiplexed sub-carriers to a new position in the communications spectrum. The advantage of the modulator in such use is the minimization of intermodulation products which might otherwise be generated between the various spectrum components which comprise the mutiplex.

When so used, the carrier which is to be modulated is impressed across primary 14A of transformer 14. The modulation component is introduced across primary 1A of transformer 1. The modulated carrier appears across load 12.

The operation of the circuit as a modulator is analogous to the operation as a phase detector with respect to the operation of the pairs of transistors 3 and 7 and 2 and 8.

In the case where linear modulation is required voltage source 4 is chosen to be larger than the peak voltage appearing across one-half at secondary 1B of transformer 1.

It is to be understood that the circuit depicted in FIG. 1 is merely indicated as illustrative of the present invention. Variations in this circuit, for example, by substitution of equivalent components, may be made by one skilled in the art without departing from the spirit and scope of this invention.

I claim:

1. Translation circuit apparatus comprising in combination a first pair of current switching means, means for activating each of said switching means of said pair in response to a signal of a different sense from a first electrical source, means for biasing each of said first pair of transistors at a potential which is in a range extending downwardly from substantially one-half of the value of the amplitude of the signals of said first source, a second pair of current switching means, means for activating each of said switching means of said second pair in response to a signal of a different sense from a second electrical source, each of said second pair of switching means being serially connected with one of said first pair of switching means thereby forming two paths each of which includes one of the said first and one of the said second switching means, and a load connected to receive the current which flows through either of said paths, said current flowing only when two serially connected switching means are conducting simultaneously.

2. Translation circuit apparatus comprising in combination a pair of transistors, means for switching each of said transistors in response to a signal of a different sense from a first electrical source, a pair of current switching means, means for activating each of said switching means of said pair in response to a signal of different sense from a second electrical source, each of said pair of switching means being serially connected with a different one of said pair of transistors thereby forming two paths each of which includes one of said transistors and one of said switching means, each of said switching means being bypassed by a separate bypass electrical circuit composed of a unidirectional conducting element connected to at least one D.C. potential source, each of the bypass circuits being respectively connected to the collector-to-emitter circuit of the transistor in circuit with the bypassed switching means, and a load connected to receive the current which flows through either of said paths, said current flowing only when a serially connected transistor and switching means are conducting simultaneously.

3. Translation circuit apparatus comprising in combination a first pair of transistors, means for alternately switching each of said transistors in response to the alternate excursions of the signals from a first electrical source, a second pair of transistors, means for activating each of the transistors of said second pair in response to a signal of a different sense from a second electrical source, each of said second pair of transistors being serially connected with a different one of said first pair of transistors thereby forming two paths each of which includes one of the said first and one of the said second pairs of transistors, each of the said second pair of transistors being bypassed by a respective bypass electrical circuit composed of a unidirectional conducting element connected to at least one D.C. potential source, each of the said bypass circuits being connected to the collector-to-emitter circuit of a different one of the first pair of transistors, and a load connected to receive the current which flows through either of said paths, said current flowing only when two serially connected transistors are conducting simultaneously.

4. The apparatus of claim 3 in which said means for switching each of said first pair of transistors in response to the alternate excursions of the signals from a first electrical source includes a first coupling means connected between the said first electrical source and the respective base elements of said first pair of transistors, said first coupling means being connected so that the respective signals received by the said base elements are in phase opposition to one another, and in which said activating means includes a second coupling means connected between the said second electrical source and the respective base elements of said second pair of transistors, said second coupling means being connected so that the respective signals received by the base elements of said second pair of transistors are in phase opposition to one another.

5. Circuit apparatus comprising a first source of electrical signals, a first pair of transistors, first means for coupling said first source to the respective base elements of said transistors in phase opposition, means for biasing each of said first pair of transistors at a potential which is in a range extending downwardly from substantially one-half of the value of the amplitude of the signals of said first source, a second source of electrical signals, a second pair of transistors, second means for coupling said second source to the respective base elements of said second pair of transistors in phase opposition, a load, said first and said second pair of transistors providing a first and a second path for current flow through said load, one transistor of said first pair and one transistor of said second pair being in circuit with said first path for current flow, and the other transistor of said first pair and the other transistor of said second pair being in circuit with said second path for current flow, whereby current flows through said first path and said load when the respective base elements of the two transistors associated with said first path receive respective signals of the same polarity, and current flows through said second path and said load when the respective base elements of the two transistors associated with said second path receive respective signals of the same polarity.

6. Circuit apparatus comprising a first source of electrical signals, a first pair of transistors, first means for coupling said first source to the respective base elements of said transistors in phase opposition, means for biasing each of said first pair of transistors at a potential which is in a range extending downwardly from substantially one-half of the value of the amplitude of the signals of said first source, a second source of electrical signals, a second pair of transistors, second means for coupling said second source to the respective base elements of said second pair of transistors in phase opposition, a pair of unidirectional current devices in circuit with each of said second pair of transistors and said second coupling means, each unidirectional current device shunting the transistor in circuit therewith until a predetermined level of said second coupling means is reached, a load, said first and said second pair of transistors providing a first and a second path for current flow through said load, one transistor of said first pair and one transistor of said second pair being in circuit with said first path for current flow, and the other transistor of said first pair and the other transistor of said second pair being in circuit with said second path for current flow, whereby current flows through said first path and said load when the respective base elements of the two transistors associated with said first path receive respective signals of the same polarity, and current flows through said second path and said load when the respective base elements of the two transistors associated with said second path receive respective signals of the same polarity.

7. Circuit apparatus comprising a first source of electrical signals, a first pair of transistors, a first tapped transformer for coupling said first source to the respective base elements of said transistors in phase opposition, means for biasing said first pair of transistors at a potential which is in a range extending downwardly from substantially one-half of the amplitude of the signals of said first source, a second source of electrical signals, a second pair of transistors, a second tapped transformer for coupling said second source to the respective base elements of said second pair of transistors in phase opposition, a pair of diodes in opposed relationship connected across said second tapped transformer and said second pair of transistors, said diodes shunting said transistors until the switching condition thereof, a load, said first and said second pair of transistors providing a first and a second path for current flow through said load, one transistor of said first pair and one transistor of said second pair being in circuit with said first path for current flow, and the other transistor of said first pair and the other transistor of said second pair being in circuit with said second path for current flow, whereby current flows through said first path and said load when the respective base elements of the two transistors associated with said first path receive respective signals of the same polarity, and current flows through said second path and said load when the respective base elements of the two transistors associated with said second path receive respective signals of the same polarity.

References Cited by the Examiner

UNITED STATES PATENTS 2,827,611 3/1958 Beck ---------------- 332—52

FOREIGN PATENTS 715,353 9/1954 Great Britain.

OTHER REFERENCES

Raytheon Semiconductor Engineering File, "Practical Considerations for the Application of Junction Transistors in Chopper Circuits," Reynolds file No. 128-T, 14 pages, September 1957.

ROY LAKE, *Primary Examiner.*

A. L. BRODY, *Examiner.*